United States Patent
Bian et al.

(10) Patent No.: US 12,529,852 B2
(45) Date of Patent: Jan. 20, 2026

(54) PHOTONIC STRUCTURES INCLUDING MULTIPLE INPUT/OUTPUT OPTICAL COUPLERS

(71) Applicant: GlobalFoundries U.S. Inc., Malta, NY (US)

(72) Inventors: Yusheng Bian, Ballston Lake, NY (US); Theodore Letavic, Putnam Valley, NY (US); Kenneth J. Giewont, Hopewell Junction, NY (US); Kevin Dezfulian, Arlington, VA (US); Koushik Ramachandran, Wappingers Falls, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 289 days.

(21) Appl. No.: 18/243,701

(22) Filed: Sep. 8, 2023

(65) Prior Publication Data
US 2025/0085491 A1    Mar. 13, 2025

(51) Int. Cl.
*G02B 6/42* (2006.01)
*G02B 6/02* (2006.01)

(52) U.S. Cl.
CPC ....... *G02B 6/4214* (2013.01); *G02B 6/02042* (2013.01); *G02B 6/4206* (2013.01)

(58) Field of Classification Search
CPC . G02B 6/4206; G02B 6/4214; G02B 6/02042
See application file for complete search history.

(56) References Cited

U.S. PATENT DOCUMENTS

2017/0102503 A1*   4/2017   Israel ................ G02B 6/4259
2021/0165165 A1    6/2021   Israel et al.

OTHER PUBLICATIONS

Teramount Photonic-Plug Technology, [retrieved on Dec. 9, 2022], retrieved from <URL: https://teramount.com/technology>.
Mu, Xin, Sailong Wu, Lirong Cheng, and H.Y. Fu. 2020. "Edge Couplers in Silicon Photonic Integrated Circuits: A Review" Applied Sciences 10, No. 4: 1538. https://doi.org/10.3390/app10041538.
Martin Papes et al., "Fiber-chip edge coupler with large mode size for silicon photonic wire waveguides," Optics Express 24, 5026-5038 (2016).

(Continued)

*Primary Examiner* — Michael P Mooney
(74) *Attorney, Agent, or Firm* — Thompson Hine LLP; Anthony Canale

(57) ABSTRACT

Photonic structures including multiple input/output optical couplers and methods of forming such photonic structures. The photonic structure comprises a light source and a photonics chip including a semiconductor substrate. The photonic structure further comprises a first mirror disposed at a first height relative to a top surface of the semiconductor substrate and a second mirror disposed at a second height relative to the top surface of the semiconductor substrate. The first mirror is configured to reflect first light from the light source to the photonics chip, and the second mirror is configured to reflect second light from the light source to the photonics chip. The first mirror is disposed between the second mirror and the light source, and the second height is different from the first height.

20 Claims, 6 Drawing Sheets

(56) References Cited

OTHER PUBLICATIONS

Niharika Kohli, Michael Menard, and Winnie N. Ye, "Efficient TE/TM spot-size converter for broadband coupling to single mode fibers," OSA Continuum 2, 2428-2438 (2019).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A CMOS Compatible Monolithic Fiber Attach Solution with Reliable Performance and Self-alignment," In Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), San Diego, CA, USA, 2021, pp. 2279-2284, doi: 10.1109/ECTC32696.2021.00357.

Y. Bian et al., "Light manipulation in a monolithic silicon photonics platform leveraging 3D coupling and decoupling, " in Frontiers in Optics / Laser Science, B. Lee, C. Mazzali, K. Corwin, and R. Jason Jones, eds., OSA Technical Digest (Optica Publishing Group, 2020), paper FTu6E.3.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Bian, Yusheng "Dual-Layer Edge Couplers With Curved Coupling-Assistance Features" filed on Mar. 27, 2023 as a U.S. Appl. No. 18/126,745.

\* cited by examiner

PHOTONIC STRUCTURES INCLUDING MULTIPLE INPUT/OUTPUT OPTICAL COUPLERS

BACKGROUND

The present disclosure relates to photonics chips and, more specifically, to photonic structures including multiple input/output optical couplers and methods of forming such photonic structures.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber.

A spot-size converter, also known as an edge coupler, is a type of optical coupler that is commonly used for coupling light of a given mode from the light source to the photonic integrated circuit. The spot-size converter may include a section of a waveguide core that defines an inverse taper having a tip. The narrow end of the inverse taper at the tip is positioned adjacent to the light source, and the wide end of the inverse taper is connected to another section of the waveguide core that routes the light to the photonic integrated circuit.

The gradual variation in the cross-sectional area of the inverse taper supports mode transformation and mode size variation associated with mode conversion when light is transferred from the light source to the spot-size converter. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width dimension increases, the inverse taper can support the entire incident mode and confine the electromagnetic field.

Optical input and output based on spot-size converters has limited scalability for increasing the number of optical fibers coupled to a photonics chip. The available space at the edges of the photonics chip for grooves in which to seat optical fibers and the ability to reduce the separation between adjacent optical fibers are limiting factors on the achievable dimensional reductions. This input/output bottleneck may operate to restrict the data rate for communication with the photonics chip.

Improved photonic structures including multiple input/output optical couplers and methods of forming such photonic structures are needed.

SUMMARY

In an embodiment of the invention, a photonic structure comprises a light source and a photonics chip including a semiconductor substrate. The photonic structure further comprises a first optical coupler including a first mirror disposed at a first height relative to a top surface of the semiconductor substrate and a second optical coupler including a second mirror disposed at a second height relative to the top surface of the semiconductor substrate. The first optical coupler is configured to reflect first light from the light source to the photonics chip, and the second optical coupler is configured to reflect second light from the light source to the photonics chip. The first optical coupler is disposed between the second optical coupler and the light source, and the second height is different from the first height.

In an embodiment of the invention, a photonic structure comprises a light source, a photonics chip including a semiconductor substrate and a spot-size converter, a mirror disposed adjacent to the spot-size converter, and a plurality of lenses disposed over a top surface of the semiconductor substrate. The lenses are configured to direct light from the light source to the mirror, and the mirror is configured to reflect the light to the spot-size converter.

In an embodiment of the invention, a method of forming a photonic structure is provided. The method comprises forming a first mirror disposed at a first height relative to a top surface of a semiconductor substrate of a photonics chip and forming a second mirror disposed at a second height relative to the top surface of the semiconductor substrate. The first mirror is configured to reflect first light from a light source to the photonics chip, and the second mirror is configured to reflect second light from the light source to the photonics chip. The first mirror is disposed between the second mirror and the light source, and the second height is different from the first height.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
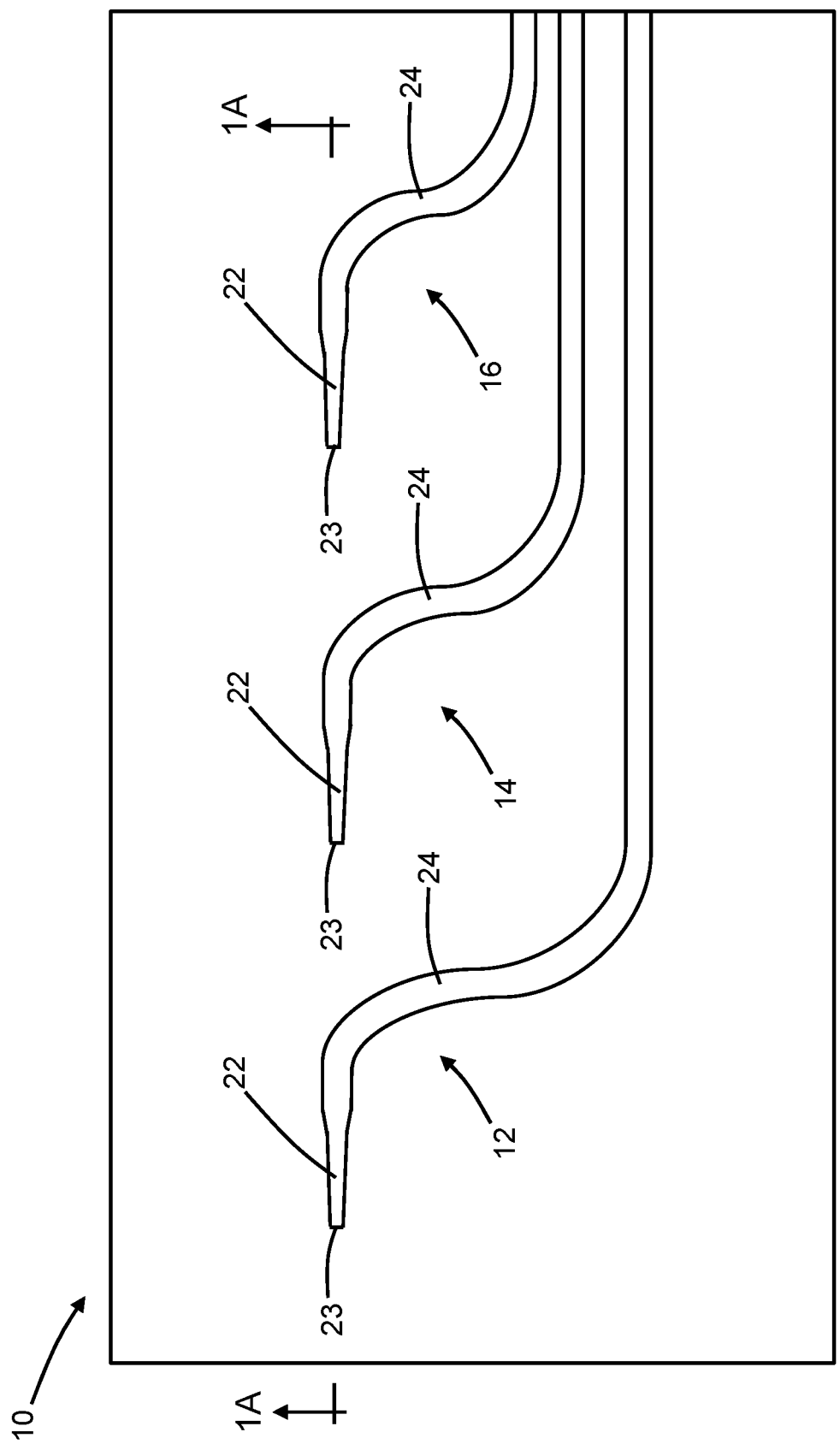
FIG. 1 is a top view of a structure at an initial fabrication stage of a processing method in accordance with embodiments of the invention.
Figure 1A:
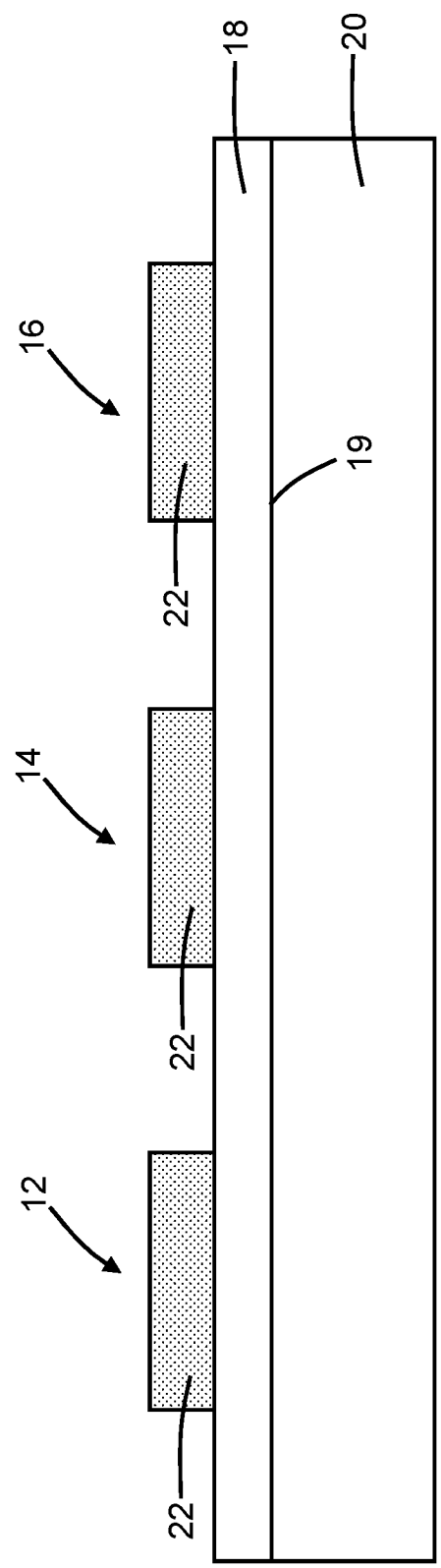
FIG. 1A is a cross-sectional view taken generally along line 1A-1A in FIG. 1.

With reference to FIGS. 1, 1A and in accordance with embodiments of the invention, a structure 10 includes waveguide cores 12, 14, 16 that are disposed on and over a dielectric layer 18 and a semiconductor substrate 20. In an embodiment, the dielectric layer 18 may be comprised of a dielectric material, such as silicon dioxide, and the semiconductor substrate 20 may be comprised of a semiconductor material, such as single-crystal silicon. In an embodiment, the dielectric layer 18 may be a buried oxide layer of a silicon-on-insulator substrate, and the dielectric layer 18 may fully separate the waveguide cores 12, 14, 16 from the semiconductor substrate 20. In an alternative embodiment, one or more additional dielectric layers comprised of, for example, silicon dioxide may be positioned between the waveguide cores 12, 14, 16 and the dielectric layer 18. The semiconductor substrate 20 may adjoin the dielectric layer 18 along an interface 19, which represents a top surface of the semiconductor substrate 20 and a bottom surface of the dielectric layer 18.

In an embodiment, the waveguide cores 12, 14, 16 may be comprised of a material having a refractive index that is greater than the refractive index of silicon dioxide. In an embodiment, the waveguide cores 12, 14, 16 may be comprised of a semiconductor material, such as single-crystal silicon or polysilicon. In an embodiment, the waveguide cores 12, 14, 16 may be formed by patterning a layer comprised of their constituent material with lithography and etching processes. In an embodiment, an etch mask may be formed by a lithography process over a layer of the constituent material of the waveguide cores 12, 14, 16, and unmasked sections of the layer may be etched and removed by an etching process. The shape of the etch mask determines the patterned shape of the waveguide cores 12, 14, 16. In an embodiment, the waveguide cores 12, 14, 16 may be formed by patterning the semiconductor material, for example single-crystal silicon, of a device layer of a silicon-on-insulator substrate. In an embodiment, the waveguide cores 12, 14, 16 may be formed by depositing a layer comprised of their constituent material, for example polysilicon, and patterning the deposited layer.

Each of the waveguide cores 12, 14, 16 includes a spot-size converter 22 and a section 24 that is adjoined to the spot-size converter 22. The spot-size converter 22 of the waveguide core 12, the spot-size converter 22 of the waveguide core 14, and the spot-size converter 22 of the waveguide core 16 may be disposed in a row. Each section 24 includes bends that reroute the respective one of the waveguide cores 12, 14, 16 in a lateral direction away from the spot-size converter 22. The sections 24 of the different waveguide cores 12, 14, 16 provide lateral displacements in the layout that the permit the spot-size converters 22 to be arranged in a row.

In an embodiment, each spot-size converter 22 may taper with a width dimension that increases with increasing distance from a terminating end 23. In an embodiment, the width dimension of each spot-size converter 22 may linearly increase with increasing distance from the terminating end 23. In an alternative embodiment, the width dimension of each spot-size converter 22 may change based on a non-linear function, such as a quadratic function, a cubic function, a parabolic function, a sine function, a cosine function, a Bezier function, or an exponential function. In an embodiment, each spot-size converter 22 may have a uniform taper angle. In an alternative embodiment, each spot-size converter 22 may taper in multiple stages characterized by different taper angles.

In alternative embodiments, each spot-size converter 22 may include a metamaterial characterized by a periodic subwavelength grating or an apodized subwavelength grating, and the subwavelength grating may be disposed in a single layer or in multiple layers. In alternative embodiments, each spot-size converter 22 may include a set of segments or pegs that may be optionally overlaid either partially or fully by a rib or fishbone, and the pegs may be disposed in a single layer or in multiple layers. In alternative embodiments, each spot-size converter 22 may include features of different thickness.

Figure 2:
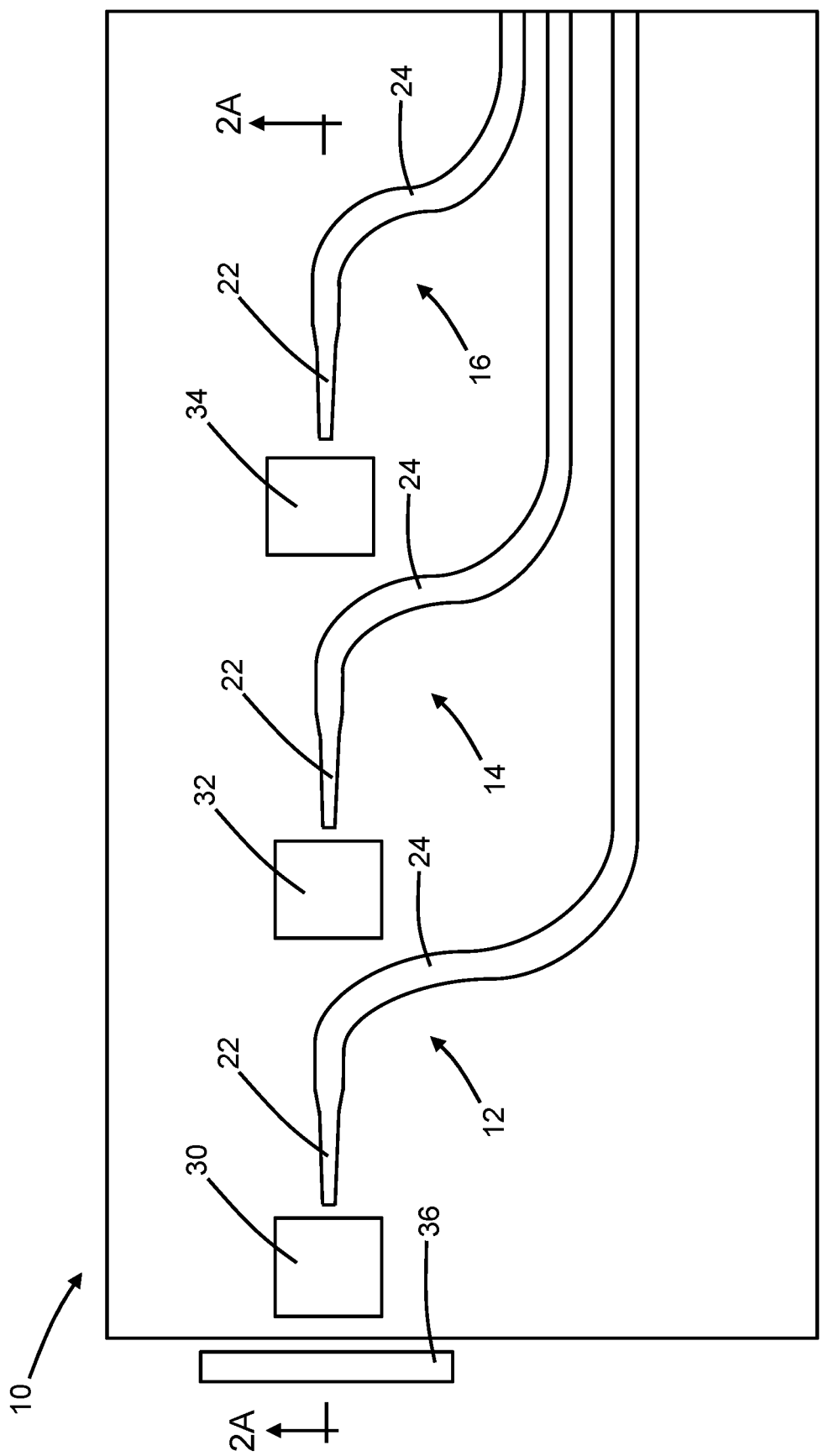
FIG. 2 is a top view of the structure at a fabrication stage of the processing method subsequent to FIG. 1.
Figure 2A:
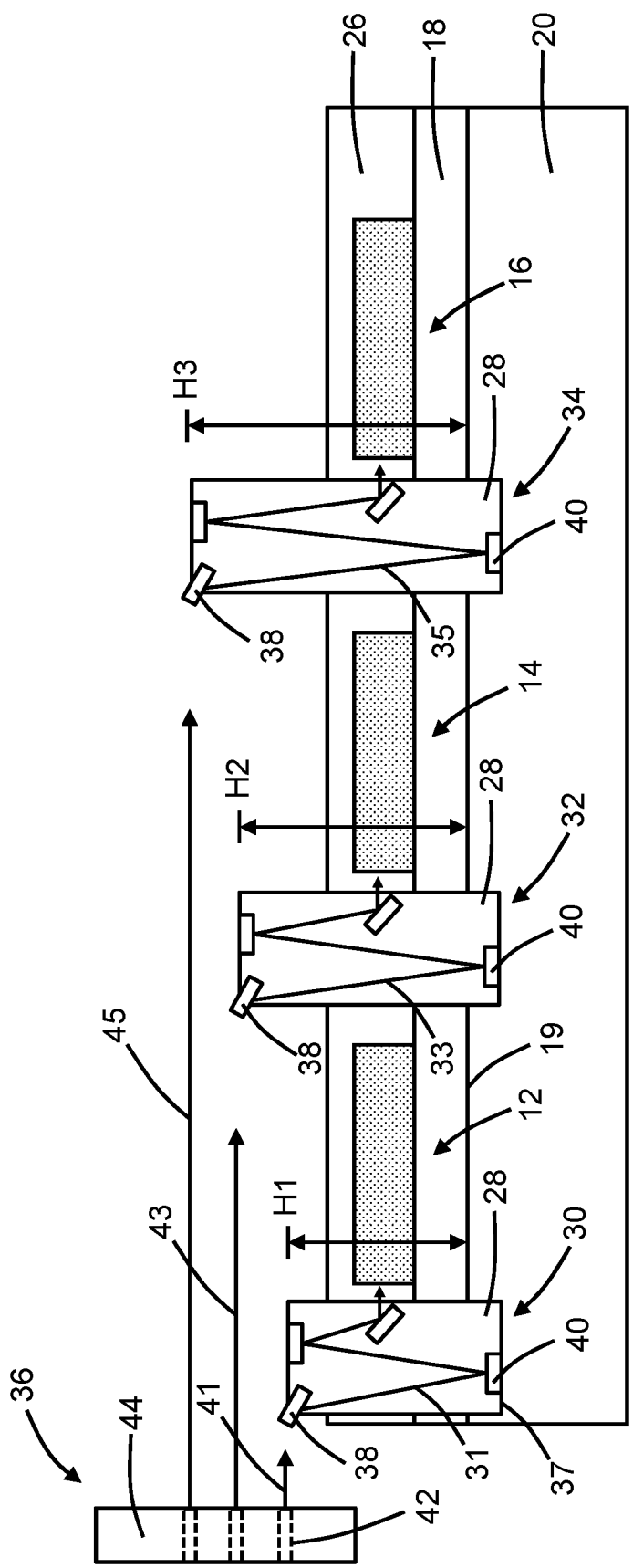
FIG. 2A is a cross-sectional view taken generally along line 2A-2A in FIG. 2.

With reference to FIGS. 2, 2A in which like reference numerals refer to like features in FIGS. 1, 1A and at a subsequent fabrication stage, the waveguide cores 12, 14, 16 may be embedded in a dielectric layer 26. The dielectric layer 26 may be comprised of a dielectric material, such as silicon dioxide, having a refractive index that is less than the refractive index of the material constituting the waveguide cores 12, 14, 16. The dielectric layer 26 may replace the heterogenous interlayer dielectric layers of one or more removed sections of a back-end-of-line stack (not shown).

Optical couplers 30, 32, 34 may be respectively disposed adjacent to the spot-size converters 22 of the waveguide cores 12, 14, 16, and an optical fiber 36 may be disposed adjacent to the optical coupler 30. In an embodiment, the optical couplers 30, 32, 34 may provide a fiber-to-chip optical connection for the optical fiber 36. In an embodiment, the optical coupler 30 may be disposed adjacent to the terminating end 23 of the spot-size converter 22 of the waveguide core 12. In an embodiment, the optical coupler 32 may be disposed adjacent to the terminating end 23 of the spot-size converter 22 of the waveguide core 14. In an embodiment, the optical coupler 34 may be disposed adjacent to the terminating end 23 of the spot-size converter 22 of the waveguide core 16. The optical couplers 30, 32, 34 may be disposed, at least in part, in cavities 37 that are patterned in the photonics chip. The optical couplers 30, 32, 34 may be arranged in a row, and the optical couplers 30, 32, 34 may alternate in the row with the spot-size converters 22 of the waveguide cores 12, 14, 16 to provide an interleaved arrangement.

In an embodiment, each of the optical couplers 30, 32, 34 may include a mirror 38 and mirrors 40 that are configured to collimate and focus the light received from the optical fiber 36 and to provide the collimated, focused light by multiple reflections to the spot-size converters 36 of the waveguide cores 12, 14, 16. Each of the optical couplers 30, 32, 34 may include a body 28 in which the mirrors 38, 40 are held in fixed positions. In an embodiment, each body 28 may be comprised of one or more materials that are optically transparent.

Each set of the mirrors 38, 40 defines beam-deflection optics that directs light from the optical fiber 36 to the photonics chip. The mirrors 38, 40 of the optical coupler 30 direct light 41 received from the optical fiber 36 by multiple reflections in a light path 31 that ends at the spot-size converter 22 of the waveguide core 12. In an embodiment, the light path 31 may begin at the mirror 38 of the optical coupler 30 and end at the terminating end 23 of the spot-size converter 22 of the waveguide core 12. The mirrors 38, 40 of the optical coupler 32 direct light 43 received from the optical fiber 36 by multiple reflections in a light path 33 that ends at the spot-size converter 22 of the waveguide core 14. In an embodiment, the light path 33 may begin at the mirror 38 of the optical coupler 32 and end at the terminating end 23 of the spot-size converter 22 of the waveguide core 14. The mirrors 38, 40 of the optical coupler 34 direct light 45 received from the optical fiber 36 by multiple reflections in a light path 35 that ends at the spot-size converter 22 of the waveguide core 16. In an embodiment, the light path 35 may begin at the mirror 38 of the optical coupler 34 and end at the terminating end 23 of the spot-size converter 22 of the waveguide core 16.

In an embodiment, the optical fiber 36 may be a multicore optical fiber that includes multiple cores 42 that may have an off-axis arrangement inside a common cladding 44. Each core 42 may be designed to support a single mode. The cores 42 of the optical fiber 36 may behave as a bundle of single-mode optical fibers with negligible modal overlap. The optical fiber 36 is spaced in a vertical direction from the photonics chip, and the optical fiber 36 is not seated in a groove in the photonics chip. In an alternative embodiment, the optical fiber 36 may be a photonic-crystal fiber.

The mirror 38 of the optical coupler 30 may disposed at a height H1 relative to the interface 19 between the dielectric layer 18 and the semiconductor substrate 20. The mirror 38 of the optical coupler 32 may be disposed at a height H2 relative to the interface 19 between the dielectric layer 18 and the semiconductor substrate 20. The mirror 38 of the optical coupler 34 may be disposed at a height H3 relative to the interface 19 between the dielectric layer 18 and the semiconductor substrate 20. The heights H1, H2, H3 are different with the height H3 being greater than the height H2 and the height H2 being greater than the height H1. In an embodiment, the heights H1, H2, H3 may progressively increase with increasing distance from the optical fiber 36.

One or more of the cores 42 of the optical fiber 36 may be aligned or substantially aligned with the mirror 38 of the optical coupler 30 at the height H1. The mirror 38 of the optical coupler 30 is configured to receive the light 41 from the one or more cores 42 and to transfer the received light 41 to the mirrors 40 of the optical coupler 30. The mirrors 40 of the optical coupler 30, which may be curved reflectors, collimate and focus the light that is directed in the light path 31 to the spot-size converter 22 of the waveguide core 12.

One or more of the cores 42 of the optical fiber 36 may be aligned or substantially aligned with the mirror 38 of the optical coupler 32 at the height H2. The mirror 38 of the optical coupler 32 is configured to receive the light 43 from the one or more cores 42 and to transfer the received light to the mirrors 40 of the optical coupler 32. Because the height H2 is greater than the height H1, the light 43 received by the optical coupler 32 is unobstructed by the placement of the optical coupler 30 between the optical coupler 32 and the optical fiber 36. The mirrors 40 of the optical coupler 32, which may be curved reflectors, collimate and focus the light that is directed in the light path 33 to the spot-size converter 22 of the waveguide core 14.

One or more of the cores 42 of the optical fiber 36 may be aligned or substantially aligned with the mirror 38 of the optical coupler 34 at the height H3. The mirror 38 of the optical coupler 34 is configured to receive the light 45 from the one or more cores 42 and to transfer the received light to the mirrors 40 of the optical coupler 34. Because the height H3 is greater than either the height H1 or the height H2, the light 45 received by the optical coupler 34 is unobstructed by the placement between of the optical coupler 30 between the optical coupler 34 and the optical fiber 36 and by the placement of the optical coupler 32 between the optical coupler 34 and the optical fiber 36. The mirrors 40 of the optical coupler 34, which may be curved reflectors, collimate and focus the light that is directed in the light path 35 to the spot-size converter 22 of the waveguide core 16.

In an alternative embodiment, the structure 10 may include one or more additional sets of optical couplers like the optical couplers 30, 32, 34, and each additional set of optical couplers may be arranged in a row. In an embodiment, the optical couplers 30, 32, 34 and the additional sets of optical couplers may be arranged in the rows and columns of an array. The different heights of the mirrors 38 in each row effectively adds a third dimension to the array. Each row of additional optical couplers may be associated with a distinct optical fiber like the optical fiber 36.

In an embodiment, the optical couplers 30, 32, 34 may be elements of an assembly that includes a carrier, a substrate layer, and a spacer that is transmissive of the light received from the optical fiber 36. The mirrors 38, 40 of each of the optical couplers 30, 32, 34 may be distributed among the carrier, the substrate layer, and the spacer, which may incorporate the body 28 of each of the optical couplers 30, 32, 34. The substrate layer may include a groove with a V-shape or a U-shape that is configured to receive and seat the optical fiber 36 in alignment with the optical couplers 30, 32, 34. In an embodiment, the assembly including the optical couplers 30, 32, 34 may provide a pluggable input/output interface for the photonics chip.

In an alternative embodiment, the optical fiber 36 may be replaced by a different type of light source, such as a laser, a semiconductor optical amplifier, or a vertical-cavity surface-emitting laser. In an alternative embodiment, the mirrors 38, 40 of one or more of the optical couplers 30, 32, 34 may introduce a lateral offset into one or more of the light paths 31, 33, 35.

The configuration of the optical couplers 30, 32, 34 and the interleaved arrangement of the spot-size converters 22 and optical couplers 30, 32, 34 expand the number of input/output ports that can receive light from the optical fiber 36 by providing a three-dimensional configuration. The scalability of the optical input and optical output is less limited than in conventional configurations that differ from the three-dimensional configuration, for example, in the absence of a third dimension. The available space at an edge of the photonics chip is not limited by the number of grooves available for seating optical fibers, and the minimum separation between adjacent optical fibers is less of a limiting factor. The configuration of the optical couplers 30, 32, 34 and the interleaved arrangement of the spot-size converters 22 and optical couplers 30, 32, 34 eases the data rate restrictions imposed by the input-output bottleneck of conventional input/output configurations for communicating with a photonics chip.

Figure 3:
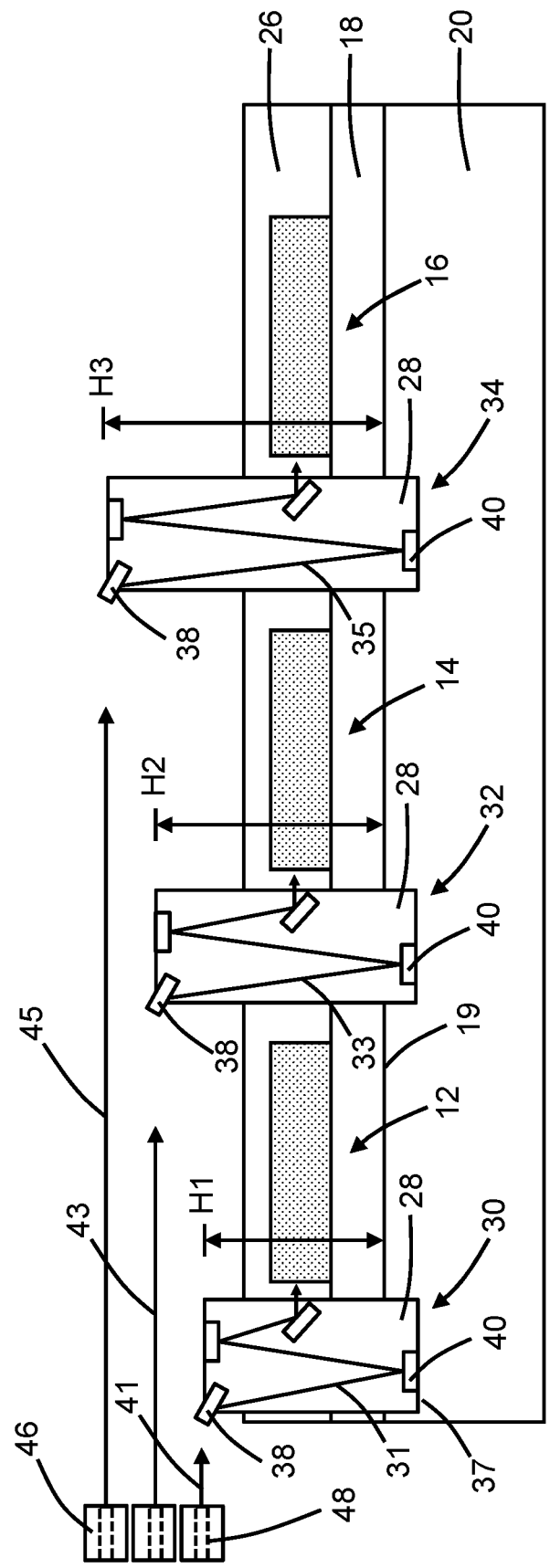
FIG. 3 is a cross-sectional view of a structure in accordance with alternative embodiments of the invention.

With reference to FIG. 3 and in accordance with alternative embodiments, the structure 10 may be modified to include multiple optical fibers 46 each having a core 48 that is aligned with one of the mirrors 38. In an embodiment, each optical fiber 46 may include a single core 48. The optical fibers 46 may be arranged in a stack or, alternatively, may have a staggered arrangement.

Figure 4:
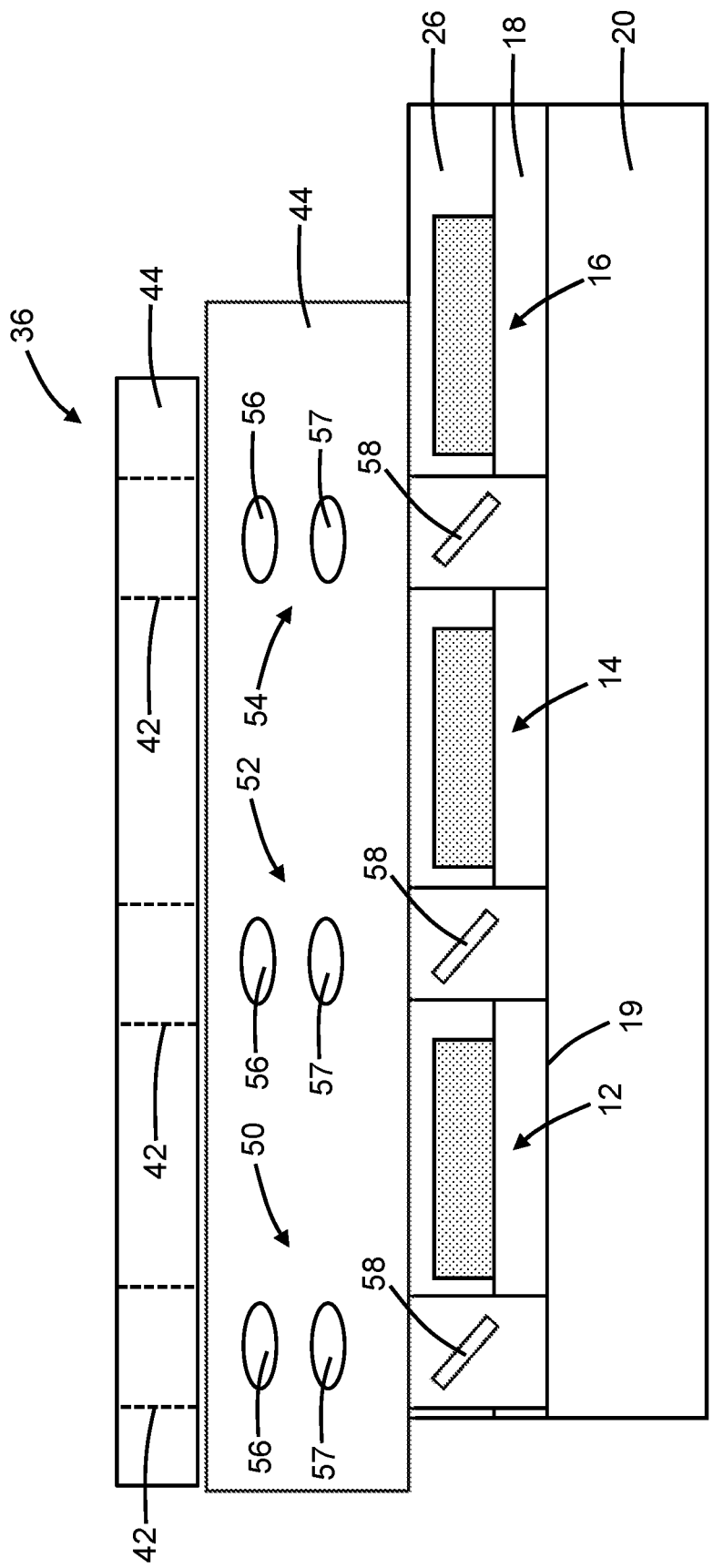
FIG. 4 is a cross-sectional view of a structure in accordance with alternative embodiments of the invention.

With reference to FIG. 4 and in accordance with alternative embodiments, the structure 10 may be modified to include optical couplers 50, 52, 54 and to place the optical fiber 36 over the optical couplers 50, 52, 54. Light from the cores 42 of the optical fiber 36 propagates toward the optical couplers 50, 52, 54. Each of the optical couplers 50, 52, 54 may include lenses 56, 57 and a mirror 58 that cooperate as optical components to transfer light from one of the cores 42 to one of the spot-size converters 22. Each set of lenses 56, 57 may focus or disperse the light received from the corresponding core 42, and the mirror 58 may reflect the light to provide a change in direction to accommodate the horizontal orientation of the spot-size converters 22. In an embodiment, the light from each core 42 of the optical fiber 36 may propagate in a vertical direction toward the lenses 56, 57 of one of the optical couplers 50, 52, 54, the mirror 58 may receive the light after passage through the lenses 56, 57, and the mirror 58 may reflect the received light in a horizontal direction toward one of the spot-size converters 22.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photonic structure comprising:
    a light source;
    a photonics chip including a semiconductor substrate, the semiconductor substrate having a top surface;
    a first optical coupler including a first mirror disposed at a first height relative to the top surface of the semiconductor substrate, the first mirror configured to reflect first light from the light source to the photonics chip; and
    a second optical coupler including a second mirror disposed at a second height relative to the top surface of the semiconductor substrate, the second mirror configured to reflect second light from the light source to the photonics chip,
    wherein the first mirror is disposed between the second mirror and the light source, and the second height is different from the first height.

2. The photonic structure of claim 1 wherein the light source is a multicore optical fiber including a first core and a second core, the first mirror of the first optical coupler is configured to receive the first light from the first core, and the second mirror of the second optical coupler is configured to receive the second light from the second core.

3. The photonic structure of claim 1 wherein the light source includes a first optical fiber having a first core and a second optical fiber having a second core, the first mirror of the first optical coupler is configured to receive the first light from the first core, and the second mirror of the second optical coupler is configured to receive the second light from the second core.

4. The photonic structure of claim 1 further comprising:
    a first waveguide core including a first spot-size converter,
    wherein the first optical coupler is configured to reflect the first light in a first optical path ending at the first spot-size converter.

5. The photonic structure of claim 4 further comprising:
    a second waveguide core including a second spot-size converter,
    wherein the second optical coupler is configured to reflect the second light in a second optical path ending at the second spot-size converter.

6. The photonic structure of claim 1 further comprising:
    a third optical coupler including third mirror disposed at a third height relative to the top surface of the semiconductor substrate, the third optical coupler configured to reflect third light from the light source to the photonics chip,
    wherein the third height is different from the second height.

7. The photonic structure of claim 6 wherein the second height is greater than the first height, and the third height is greater than the second height.

8. The photonic structure of claim 6 wherein the second mirror is disposed between the third mirror and the light source.

9. The photonic structure of claim 6 further comprising:
    a first waveguide core including a first spot-size converter;
    a second waveguide core including a second spot-size converter; and
    a third waveguide core including a third spot-size converter,
    wherein the first optical coupler is configured to reflect the first light in a first optical path ending at the first spot-size converter, the second optical coupler is configured to reflect the second light in a second optical path ending at the second spot-size converter, and the third optical coupler is configured to reflect the third light in a third optical path ending at the third spot-size converter.

10. The photonic structure of claim 6 wherein the first optical coupler, the second optical coupler, and the third optical coupler are disposed in a row, and the light source is disposed adjacent to the first optical coupler.

11. The photonic structure of claim 6 wherein the first optical coupler, the second optical coupler, and the third optical coupler are disposed in a row, and the first optical coupler is disposed between the light source and the second optical coupler.

12. The photonic structure of claim 11 wherein the second optical coupler is disposed between the first optical coupler and the third optical coupler.

13. The photonic structure of claim 1 wherein the second height is greater than the first height.

14. The photonic structure of claim 1 wherein the photonics chip further includes a first waveguide core having a first spot-size converter, and the first optical coupler includes a plurality of third mirrors configured to direct the first light from the first mirror to the first spot-size converter.

15. The photonic structure of claim 14 wherein the photonics chip further includes a second waveguide core having a second spot-size converter, and the second optical coupler includes a plurality of fourth mirrors configured to direct the second light from the second mirror to the second spot-size converter.

16. The photonic structure of claim 15 wherein the first waveguide core including a plurality of bends configured to route the first waveguide core past the second spot-size converter.

17. A method of forming a photonic structure, the method comprising:
    forming a first optical coupler including a first mirror disposed at a first height relative to a top surface of a semiconductor substrate of a photonics chip; and
    forming a second optical coupler including a second mirror disposed at a second height relative to the top surface of the semiconductor substrate,
    wherein the first optical coupler is configured to reflect first light from a light source to the photonics chip, the second optical coupler is configured to reflect second light from the light source to the photonics chip, the first mirror is disposed between the second mirror and the light source, and the second height is different from the first height.

18. The photonic structure of claim 4 wherein the first waveguide core comprises single-crystal silicon or polysilicon.

19. The photonic structure of claim 16 wherein the first waveguide core and the second waveguide core comprise single-crystal silicon or polysilicon.

20. The photonic structure of claim 16 wherein the first waveguide core, the second waveguide core, and the bends comprise single-crystal silicon or polysilicon.

* * * * *